(12) United States Patent
Asthana et al.

(10) Patent No.: US 7,830,408 B2
(45) Date of Patent: Nov. 9, 2010

(54) CONFERENCE CAPTIONING

(75) Inventors: Aseem Asthana, San Jose, CA (US); Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1354 days.

(21) Appl. No.: 11/315,414

(22) Filed: Dec. 21, 2005

(65) Prior Publication Data

US 2007/0143103 A1 Jun. 21, 2007

(51) Int. Cl.
*H04N 7/15* (2006.01)
(52) U.S. Cl. .................. 348/14.08; 348/14.09
(58) Field of Classification Search .......... 348/14.08, 348/14.09, 14.01, 14.07; 379/93.15, 52; 704/270, 277
See application file for complete search history.

(56) References Cited

U.S. PATENT DOCUMENTS

| | | | | |
|---|---|---|---|---|
| 6,693,663 | B1* | 2/2004 | Harris | 348/14.08 |
| 6,771,302 | B1* | 8/2004 | Nimri et al. | 348/14.08 |
| 6,816,468 | B1* | 11/2004 | Cruickshank | 370/260 |
| 2002/0191072 | A1* | 12/2002 | Henrikson | 348/14.08 |
| 2004/0189791 | A1* | 9/2004 | Haruki | 348/14.01 |
| 2004/0189793 | A1* | 9/2004 | Wang et al. | 348/14.08 |

FOREIGN PATENT DOCUMENTS

| | | |
|---|---|---|
| GB | 2319390 A | 5/1998 |
| GB | 2351628 A | 1/2001 |

OTHER PUBLICATIONS

"Cisco Meetingplace 5.3", a data sheet, 16 pages, Copyright 2004, Cisco Systems, Inc., 170 West Tasman Drive, San Jose, CA 95134.

* cited by examiner

*Primary Examiner*—Stella L Woo
(74) *Attorney, Agent, or Firm*—Trellis IP Law Group, PC

(57) ABSTRACT

A system and method for providing captioning in a conference. In an illustrative embodiment, the method includes establishing a conference between a first participant and a second participant. The conference exhibits an exchange of a first type of media between the participants. A user option is provided to augment the conference with a second type of media corresponding to the first type of media. The second type of media is then generated based on one or more conference parameters in response to the signal. In a more specific embodiment, the second type of media is automatically generated. The first type of media is provided approximately concurrently with the second type of media. The second type of media, which may represent text captions, is then selectively provided to one or more participants in the conference based on predetermined preferences.

33 Claims, 5 Drawing Sheets

CONFERENCE CAPTIONING

BACKGROUND OF THE INVENTION

This invention is related in general to communications systems and more specifically relates to systems and methods for facilitating captioning for communications applications, such as conferencing applications.

Systems for facilitating captioning are employed in various applications including foreign-film language captioning, television-broadcast audio captioning, and videoconference audio captioning. Such systems demand accurate, versatile, and efficient captioning systems.

Accurate and versatile captioning systems are particularly important in conferencing applications, such as teleconferencing, videoconferencing, and/or Web-conferencing applications, where widely-varying operating conditions often reduce captioning accuracy and demand additional versatility to accommodate the different operating conditions.

One conventional videoconferencing system with captioning functionality employs a human translator that listens to the conference and types a written record of the conversation. The written record of the conversation may then be transferred, via captions, to participants in the conference. Unfortunately, the participants, including the translator, may have difficulty understanding speakers with multiple accents, speakers in noisy environments, and so on. Furthermore, such conferencing systems often require excessive bandwidth in certain conferencing applications.

Generally, existing captioning systems often ineffectively address communication issues arising from multiple accents and/or languages, hearing problems, background noise, bad communications-link audio quality, and so on.

DETAILED DESCRIPTION OF EMBODIMENTS OF THE INVENTION

A preferred embodiment of the present invention implements a system for providing captioning in a conference between a first participant and a second participant. In a specific embodiment, the system is adapted for use with a method that includes employing a speech recognition system to convert speech from the first participant and/or the second participant into text and then automatically transferring the text, approximately concurrently with audio information corresponding to the speech, to the first participant and/or the second participant.

For clarity, various well-known components, such as video processors, power supplies, communications ports, hubs, modems, gateways, firewalls, network cards, video capture cards, Internet Service Providers (ISPs), browsers, and so on, have been omitted from the figures. However, those skilled in the art with access to the present teachings will know which components to implement and how to implement them to meet the needs of a given application.

Figure 1:
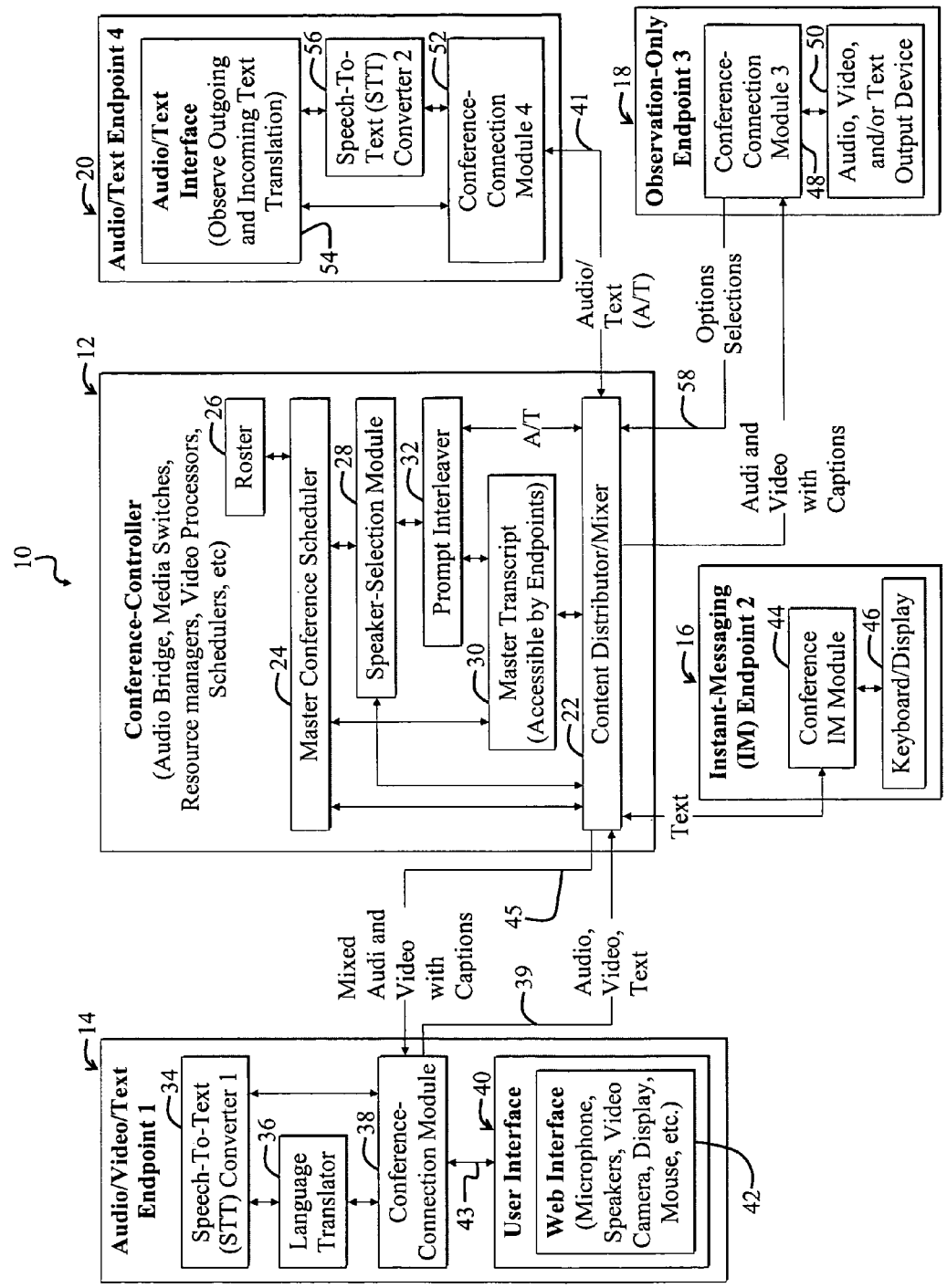
FIG. 1 is a diagram of a conferencing system exhibiting distributed speech-to-text conversion and associated conference-captioning capabilities according to a first embodiment of the present invention.

FIG. 1 is a diagram of a conferencing system 10 exhibiting distributed speech-to-text conversion and associated conference-captioning capabilities according to a first embodiment of the present invention. For the purposes of the present discussion, a caption may be a second portion of information, such as text information, that accompanies a first portion of information, such as audio or video information. Captioning is the act of using a caption in a communications session. A conference may be any communications session between plural entities. A conference parameter may be any data, such as any type of media, conference prompt, signal containing options-selection information, and so on, that is employed to facilitate the functioning of the conference.

While the embodiments discussed herein are discussed primarily with respect to text captioning for audio and video-conferencing applications, other types of captioning may be employed without departing from the scope of the present invention. For example, text captions may be replaced with graphics symbols exhibiting desired meanings as discussed more fully below.

In the present specific embodiment, the conference system 10 includes a conference-control system, i.e., conference controller 12 that interconnects plural endpoints. For illustrative purposes, the plural endpoints are shown including a first audio/video/text endpoint 14, a second Instant-Messaging (IM) endpoint 16, a third observation-only endpoint 18, and a fourth audio/text endpoint 20.

The conference controller 12 includes a content distributor 22, which may include one or more audio bridges, switches, video processors, and so on, required to meet the needs of given application. The conference controller 12 further includes a master conference scheduler 24, a speaker-selection module 28, and a master transcript module 30, which communicate with the content distributor 22. The master conference scheduler 24 further communicates with a conference roster module 26, the speaker-selection module 28, and the master transcript module 30. The speaker selection module 28 communicates with a prompt interleaver 32, which further communicates with the master transcript module 30. The prompt interleaver 32 also communicates with the content distributor 22. The exact contents of the various modules 22-32, such as the content-distributor 22, are application specific and may vary according to the needs of a given application. The content distributor 22 facilitates distributing content to and from the various intercommunicating endpoints according to predetermined conference preferences as discussed more fully below.

The first audio/video/text endpoint 14 includes a first Speech-To-Text (STT) converter 34, a conference-connection module 38, and a user interface 40 with an accompanying Web interface 42. In the present specific embodiment, a language translator 36 communicates with the first STT converter 34 and the conference-connection module 38. The conference-connection module 38 transfers audio, video, and text to the content distributor 22 of the conference controller 12. The content distributor 22 transfers selectively mixed audio and captioned video to the conference-connection module 38 of the first end point 14. In one embodiment, audio and video is mixed so that the user of the first audio/video/text endpoint 14 does not hear or see himself/herself. Alternatively, the user of the first endpoint 14 is provided an option, via the user interface 40, to affect which portions of the audio, video, and text are observed via the user interface 40.

The endpoint 16 includes a conference IM module 44 with an accompanying text interface 46, which may include a keyboard and accompanying display. For illustrative purposes, the IM module 16 communicates via instant text messaging with other endpoints 14-20 via the content distributor 22. The content distributor 22 transfers selectively mixed text to the IM endpoint 16.

The third observation-only endpoint 18 includes a third conference-connection module 48, which communicates with an audio, video, and/or text output device 50 in addition to the content distributor 22 of the conference controller 12. In the present embodiment, the third endpoint 18 receives, from the content distributor 22, various types of conference media, such as audio and video signals along with accompanying text captions.

The fourth endpoint 20 is an audio/text endpoint 20 and includes a fourth conference-connection module 52, an audio/text user interface 54, and a second STT converter 56, which communicates with the audio/text interface 54 and the conference-connection module 52. The fourth conference connection module 52 selectively communicates with the conference, i.e., the conference controller 12 via text messaging and/or audio messaging between the content distributor 22 and the fourth conference-connection module 52.

The conference controller 12 may be implemented via a central bridge, via one or more networked modules, or via other configurations without departing from the scope of the present invention. The conferencing system 10 is a type of communications system, which may be implemented via various network technologies including Internet-based technologies.

In operation, the conferencing system 10 exhibits plural features, including STT conversion at endpoints 14, 20; mixed conferencing with Web-interface and IM handling capabilities; video with text caption overlay functionality, and other communications options as discussed more fully below. Hence, text captions or other types of captions may be superimposed on video or may be communicated via separate IM windows, Web browser windows, and so on.

Furthermore, various endpoints 14, 16, 20 that optionally provide text include connection modules 38, 44, 52, respectively, that run one or more routines for providing one or more options to enable users of the endpoints 14, 16, 20 to observe outgoing text. This enables users to correct mistakes in STT conversions.

Users employ the various endpoints 14-20 and accompanying conference-connection modules 38, 44, 48, 54, respectively, to connect to the conference controller 12. For example, users may employ user interfaces 14, 46, 50, 54 to enter appropriate Internet Protocol (IP) addresses, phone numbers, and so on to initially connect to the conference controller 12. Subsequently, users log in to the conference 10 by entering appropriate login information, such as user names, passwords, and/or other data.

In the present specific embodiment, login information is forwarded from the content distributor 22 of the conference controller 12 to the master conference scheduler 24. The master conference scheduler 24 compares the login information with a predetermined conference schedule and the roster 26 to facilitate approving or denying accesses to the conference. Signaling from a particular user may be further identified by the conference controller 12 via various mechanisms, such as caller identification systems, IP-address determination systems, and so on.

The speaker-selection module 28 runs one or more software routines that determine when a particular user, i.e., conference participant, is currently contributing audio, video, or other media to the conference session and provides a signal to the prompt interleaver 32. The speaker-selection module 28 may determine which user is actively contributing to the current conference session based on input received from the master conference scheduler 24 and/or based on input received from the content distributor 22. For the purposes of the present discussion, the terms conference and conference session are employed interchangeably.

Exact implementation details for determining which speakers are active are application specific and may be readily determined by those skilled to meet the needs of a given application. Suitable speaker-selection algorithms and methods are known in the art and may be adapted for use with embodiments of the present invention without departing from the scope thereof.

In the present implementation, the participant-selection module 28 automatically determines which participant is actively contributing to the conference session based on initial login information and endpoint-identification information received by the conference controller 12 from each endpoint 14-20. Subsequently, the participant-selection module 28 selectively annotates the incoming content from the endpoints 14-20 as appropriate for each type of received content. For example, text-based annotations indicating which speaker is currently speaking may be forwarded by the prompt interleaver 32 to the content distributor 22 in preparation for selective transfer of the annotations to one or more of the endpoints 14-20. Video signals may be annotated with voice prompts without departing from the scope of the present invention. Certain types of content may not require annotation for certain applications. User-content annotation mechanisms may be omitted without departing from the scope of the present invention.

Alternatively, each conference-connection module 38, 44, 48, 54 implements hardware and/or software routines that automatically annotate output from each conference-connection module 38, 44, 48, 54 with information indicating which user is currently actively contributing to the conference session.

As a given conference session proceeds, various content from the endpoints 14, 16, 20 is received by the content distributor 22. The content distributor 22 runs one or more routines and employs one or more switches, video processors, resource managers, and so on, to facilitate selectively distributing received content to the remaining participants employing the endpoints 14-20. Furthermore, conference session content, including prompts received from the prompt interleaver 32, are communicated by content distributor 22 to the master transcript 30. The master transcript 30 is optionally accessible by users of the endpoints 14-20.

The prompts received by the content distributor 22 from the prompt interleaver 32 may be implemented via various types of media, such as Audio and/or Text (A/T) prompts. Examples of text-based conference prompts include statements indicating that a particular user has now entered the conference, statements indicating that the conference session is now closed, and so on.

In the present specific embodiment, the behavior of the content distributor 22 with respect to a given endpoint 14, 18, 20 may be adjusted by users via the user interfaces 42, 50, 54, respectively. Software for providing user options to configure the content distributor 22 may be implemented via the content distributor 22. Those skilled in the art with access to the present teachings may readily construct such software without undue experimentation.

In a default configuration, the content distributor 22 maintains information pertaining to the capabilities of each endpoint 14-20 and then selectively distributes content based on the information. For example, the first audio/video/text endpoint 14 outputs audio, video, and accompanying text captions. The text captions represent audio corresponding to speech of the user of the first endpoint 14. The text captions are output by the first STT converter 34 and relayed to the content distributor 22 via the first conference connection module 38. The audio, video, and accompanying text captions output from the first endpoint 14 may be stored via the master transcript 30 of the conference controller 12. The content distributor 22 then distributes text to the second IM endpoint 16 via an IM channel (text) between the second IM endpoint 16 and the content distributor 22. The content distributor 22 overlays the text onto conference video and forwards the result to the third observation-only endpoint 18 via a video channel (Audio and Video with Captions). The content distributor 22 then transfers text and audio on separate channels to the fourth audio/text endpoint 20 via separate audio and text channels (Audio/Text).

In the present specific embodiment, audio, video, and text are transmitted from endpoints 14, 18, 20 to the content distributor 22 via separate signals and/or on separate channels. The separate channels represent separate data streams. The channels may then be combined as needed by the content distributor 22 before transmission to other endpoints 14-20. Alternatively, the content distributor 22 transmits information on separate channels to the endpoints 14-20. The endpoints 14-20 may implement routines in the conference-connection modules 38, 44, 48, 52 to combine the media channels as desired for a given application.

Employing separate channels to transmit different types of media, such as audio and video, to the conference controller 12 provides redundancy in the event that one channel becomes degraded or otherwise inoperable. Furthermore, employing plural channels results in improved information-handling flexibility and may result in extensive bandwidth savings in certain conference-system architectures. Conventional systems wherein audio and video are combined into a single video channel typically do not exhibit such benefits.

For illustrative purposes, in the present embodiment, the first endpoint 14 is the only endpoint capable of playing and recording video via the user interface 40. However, this video is stored via the master transcript 30. Consequently, the video may be retrieved later by authenticated users via video-capable endpoints, including the first endpoint 14, or may be downloaded via other computer systems (not shown) for later viewing. Additional endpoints with fewer or more media-handling capabilities may be employed without departing from the scope of the present invention.

Various conference options, such as options specifying to the content distributor 22 which types of media will be received by a particular endpoint 14-20 may be selected via the user interfaces 42, 46, 50, 54 of the endpoints 14-20. For example, the user of the third observation-only endpoint 18 may wish to receive text captions overlaid on top of video; may wish to receive text captions in a separate IM or Web-based browser window; or may wish not to receive text captions. In this example, the user of the third endpoint 18 may employ the user interface 50 to input preference information (Options Selections), which is then forwarded to the content distributor 22 via the third conference-connection module 48. The content distributor 22 then selectively forwards content of the conference session to the third endpoint 18 based on the selected options.

Similarly, the other endpoints 14, 16, 20 are provided with various user options via functionality implemented via the content distributor 22 and the endpoints 14, 16, 20. Such user options include the option to augment a given conference session with a second type of media. For example, when the conferencing system 10 is employed initially for a text-based conference, the endpoints 14-20 may choose additional options to enable audio, video, etc. Hence, the preference information, represented via an options selection signal 58 represents an example of a signal generated in response to providing a user option to augment a conference session with a second type of media.

For illustrative purposes, the first endpoint 14 is shown exhibiting a language translator 36. In one operative scenario, the user of the first endpoint 14 does not speak the language of other participants employing the conferencing system 10. The endpoint 14 is then configured via the user interface 40 to translate audio input by the user via the user interface 40 into a language employed by the conference. The translated audio is then forwarded to the first STT 34, which converts that translated audio into text before the text is transmitted via the first conference-connection module 38 to the conference controller 12 for other participants, i.e., users of the endpoints 16, 18, 20 view. Note that one or more of the endpoints 14-20 may employ Text-To-Speech (TTS) converters (not shown) that may convert conference text, such as video text captions, to audio.

While the user interface 40 of the first audio/video/text endpoint 14 is shown including the Web interface 42 that is adapted for video conferencing, other types video conferencing interfaces may be employed without departing from the scope of the present invention. For example audio, video, and/or text may be communicated between the first endpoint 14 and the conference controller 12 via another type of communications link other than a Web-based or Internet-based communications link.

While the present embodiment is discussed with respect to text captions for audio or video signaling, other types of media may be employed without departing from the scope of the present invention. For example, text captions indicating which user is currently speaking or otherwise contributing to a given conference session may be implemented via a graphics symbol overlaid on video. Similarly, text captions corresponding to conference audio may be implemented via another type of media converter and/or via an additional type of media converter without departing from the scope of the present invention. For example, the STT converter 34 may communicate with a module (not shown) that is adapted to convert certain words or combinations of words into graphic symbols or animations that are then overlaid on video or otherwise transferred to other conference participants via the conference controller 12 and associated endpoints 14-20.

For the purposes of the present discussion a media converter is an entity, such as a device or person, that converts communication media, such as audio, video, or text media into another form. Additional examples of media converters include language translators, text-to-speech converters, speech-to-text converters, and so on. Another example of a media converter is a system that converts image-based video into less bandwidth-intensive vector-based renditions of the video. Hence, the STT converters 34, 56 and the language translator 36 represent types of media converters.

In the present embodiment, the various STT converters 34, 56 are implemented via desired, customized, and/or user-trained Active Speech Recognition (ASR) systems. However, the STT converters 34, 56 may be implemented via human STT converters without departing from the scope of the present invention.

The conferencing system 10 provides plural significant results over conventionally available systems. For example, enabling users to employ preferred STT systems, such as user-trained ASR systems, results in increased STT conversion and language-translation accuracy. Customized STT selection and language-translator selection are particularly important in applications wherein participants have widely varying accents or dialects that other participants cannot understand.

In addition to providing speaker prompts, such as text-based prompts, the system 10 enables conference participants to readily determine who is currently communicating. This is particularly important in large teleconferencing applications, where participants may not be familiar with each other's voices.

Furthermore, implementing STT functionality at the endpoints 14, 20 results in additional significantly beneficial results. Namely, in applications where audio communications links are noisy, STT conversion at the endpoints 14, 20 enables the STT converters 34, 56 to perform STT conversions on audio signals before the audio signals are subjected to the noisy communications channel. This results in improved STT conversations. Furthermore, the resulting text may be sent on a different communications channel, which may not be corrupted with noise. This provides redundancy that helps to ensure accurate communications.

STT conversion at the endpoints 14, 40 is also advantageous when the communications-link quality between the endpoints 14-20 is good. In particular, background noise from operating environments of the endpoints 14, 20 may add, thereby complicating STT conversions occurring at a centralized location, such as an audio bridge. Nevertheless, STT may occur at the conference controller 12 without departing from the scope of the present invention.

Hence, performing STT at the end points 14, 20 may reduce STT conversion problems resulting from communications link noise, aggregate background noise from different participant environments, and so on. Furthermore, decentralizing the STT reduces processing demands on the conference controller 12 and may reduce overall network bandwidth requirements, such as by minimizing the number of audio and/or video streams that must be transferred to the conference controller 12.

Additional functionality, such as whiteboards, file sharing, photo transfers, encryption systems, and so on, may be implemented in the conferencing system 10 without departing from the scope of the present invention.

Note that users of the conferencing system 10 can readily employ voice, video, and Web-conferencing resources from a Web interface, such as the interface 42; via an IM client, such as the IM endpoint 16; and/or via other mechanisms, such as a phone and Microsoft Outlook® and/or Lotus Notes® Calendars.

An exemplary method adapted for use with the conferencing system 10 involves providing a speech-to-text display, such as via the user interfaces 40, 46, 50, 54, in a videoconference. The videoconference includes first and second speakers employing two or more of the endpoints 14-20. The present method includes receiving a first data stream 39 that includes a conversion of audio speech from the first speaker. In this case, the first speaker may be using the first audio/video/text endpoint 14. The first data stream 39 incorporates speech that was translated to text via the first STT converter 34 and then received by the conference controller 12 from the first endpoint 14.

The present method further includes receiving a second data stream 41 that includes a conversion of audio speech from the second speaker, who may be employing the fourth audio/text endpoint 20 for illustrative purposes. The method further includes displaying video of the first and/or second speakers during the course of the videoconference. In the case wherein video of the second speaker is also displayed, then the user-interface 54 of the fourth endpoint 20 would also include a video camera to facilitate recording video of the second speaker. The method further includes displaying at least a portion of the first and second data streams concurrently with the video, such as via the user interfaces 40, 54.

The method may further include accepting a signal, such as a signal 43 from a user input device, such as the user interface 40, to filter a data stream, such as the outgoing data stream 39 or an incoming data stream 45 from the conference controller 12. The signal 43 may be employed by the conference-connection module 38 to prioritize a data stream, such as according to a volume level of audio speech from which the data stream 39 or 45 is derived.

The method further includes simultaneously displaying portions of both the first data stream 39 and second data stream 41 and accompanying video on a display screen implemented via the user interfaces 40 and/or 54. The portions of the data streams may be displayed as text, wherein the text is displayed as an overlay onto the video.

In the present method, the conversion of audio speech from the first speaker associated with the first endpoint 14 occurs locally to the first speaker at the first STT converter 34. The conversion of audio speech from the second speaker also occurs locally to the second speaker at the second STT converter 56 of the fourth endpoint 20.

Figure 2:
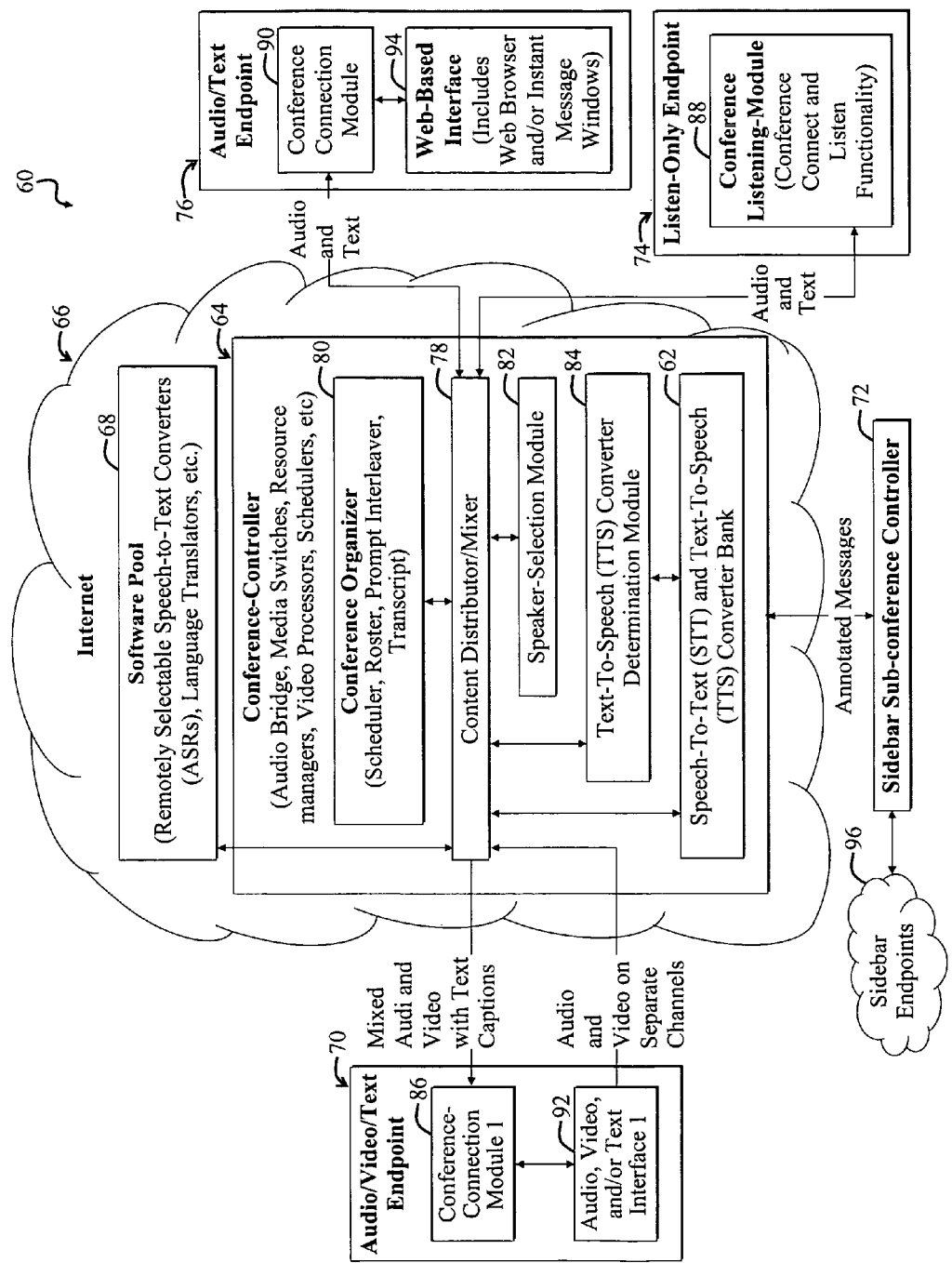
FIG. 2 is a diagram of an alternative embodiment of the conferencing system of FIG. 1 exhibiting centralized speech-to-text conversion.

FIG. 2 is a diagram of an alternative embodiment 60 of the conferencing system 10 of FIG. 1 exhibiting centralized speech-to-text conversion via an STT and TTS converter bank 62 located in an alternative conference controller 64. The alternative conferencing system 60 includes the conference controller 64, which is implemented via the Internet 66.

In the present alternative embodiment, the conference controller 64 communicates with a software pool 68, an alternative audio/video/text endpoint 70, a sidebar sub-conference controller 72, a listen-only endpoint 74, and an alternative audio/text endpoint 76. The alternative conference controller 64 includes an alternative content distributor/mixer 78, which communicates with a conference organizer 80, an alternative speaker-selection module 82, a TTS converter determination module 84, and the STT and TTS converter bank 62 of the conference controller 64. The alternative content distributor/mixer 78 further communicates with the software pool 68, the sidebar sub-conference controller 72 and conference-connection modules 86, 88, 90 of the various endpoints 70, 74, 76, respectively. Corresponding user interfaces 92, 88, 94 of the endpoints 70, 74, 76, respectively, are employed by the endpoints 70, 74, 76 to selectively exchange conference media, such as audio and video, and options-selection information with users of the endpoints 70, 74, 76.

In operation, the alternative conferencing system 60 generally operates via similar principles as the conferencing system 10 of FIG. 1 with the exception that STT conversion occurs via one or more remotely selectable STT converters in the STT and TTS converter bank 62. The converter bank 62 is incorporated in or otherwise coupled to the conference controller 64.

Users of the endpoints 70, 74, 76 may select desired STT converters for a given application from the STT and TTS converter bank 62. Furthermore, the conference controller 64 illustrates TTS functionality that may be remotely configured by users of the endpoints 70, 74, 76 to selectively convert text information into audio signals as desired for a given implementation. In addition, the alternative content distributor/mixer 78 exhibits additional capabilities that enable users to employ the sidebar sub-conference controller 72 to communicate with a side bar conference session occurring between sidebar endpoints 96. The sidebar sub-conference controller 72 and the conference controller 64 selectively exchange messages that are annotated to indicate which conference session the messages are associated with.

Additional whisper functionality may be implemented via one or more routines running on the conference connection modules 86, 88, 90 and the conference controllers 64, 72 and sidebar endpoints 96. The routines are adapted to selectively transfer information between users without other users observing the messages. Exact implementation details for implementing whisper functionality are application specific and may be readily implemented by those skilled in the art to meet the needs of a given application without undue experimentation.

Additional remotely accessible software 68 may be selectively accessed by the content distributor/mixer 78 in response to software-selection communications from one or more of the endpoints 70, 74, 76. For example, if a user of the audio/video/text endpoint 70 wishes to employ a specific language translator, the language translator may be downloaded to the STT and TTS converter bank 62 via the content distributor 78 in response to user-option information transferred from the audio/video/text endpoint 70 to the conference controller 64. After downloading from the software pool 68, the selected language translator may be employed by the user of the audio/video/text endpoint 70 to facilitate language translation. The selected language translator, STT converter, and/or TTS converter may be a media converter that has been customized by a particular user or that is otherwise preferable for a given conference user, i.e., participant.

Figure 3:
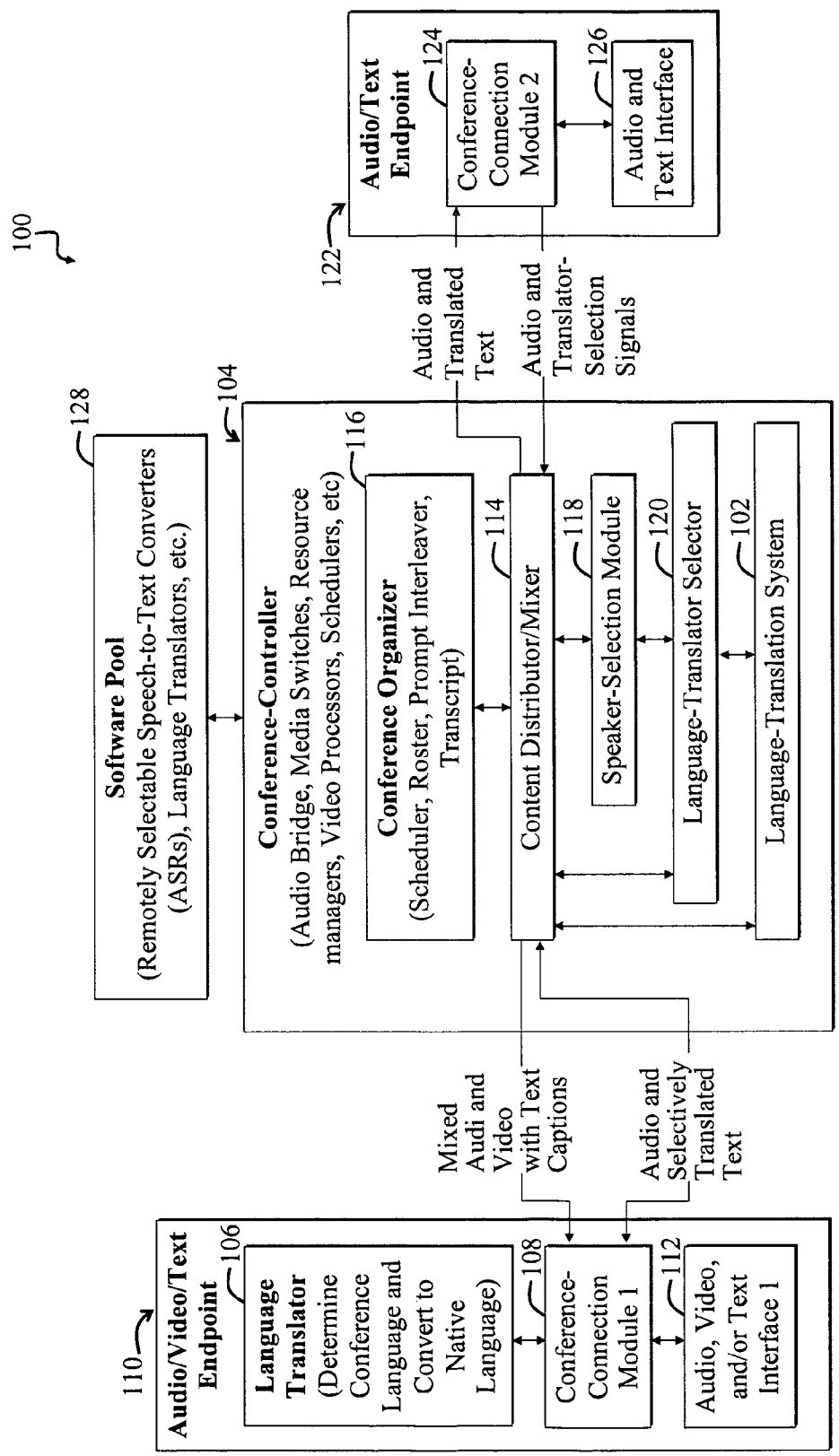
FIG. 3 is a diagram of an illustrative embodiment of the conferencing system of FIG. 1 exhibiting language-transfer and translation functionality.

FIG. 3 is a diagram of an illustrative embodiment 100 of the conferencing system 10 of FIG. 1 exhibiting language-transfer and translation functionality implemented via a centralized language-translation system 102 and/or implemented via a distributed language translator 106. The centralized language-translation system 102 is implemented in or coupled to the conference controller 104. The distributed language translator 106 is implemented in or coupled to an audio/video/text endpoint 110.

The illustrative audio/video/text endpoint 110 further includes a conference-connection module 108, which communicates with an audio/video/text interface 112, the language translator 106, and a content distributor/mixer 114 of the conference controller 104. The content distributor/mixer 114 further communicates with a conference organizer 116, a speaker-selection module 118, a language-translator selector 120, and the language-translation system 102, all of which are included in or coupled to the conference controller 104.

The conference controller 104 may be implemented via modules that are distributed over a network rather than maintained at a central location without departing from the scope of the present invention. A second audio/text endpoint 122 includes a second conference-connection module 124, which communicates with an audio/text interface 126 and the content distributor/mixer 114 of the conference controller 104.

In operation, a given conference session may proceed in a given language agreed upon by the participants. Alternatively, the language translator 106 runs one or more language-determination routines that enable the translator 106 to automatically connect to the conference controller 104 and then determine the language of the conference. The selected conference language may be maintained via the conference organizer 116, which implements conference-scheduling, prompt interleaving, transcript maintenance, and roster functionality in the present specific embodiment.

When a user, such as the user of the audio/video/text endpoint 110 does not speak the language of the conference, the user may employ the language translator 106 to translate the conference audio and/or text to the user's language, which is then played back as audio and/or displayed as text to the user via the audio/video/text interface 112 of the audio/video/text endpoint 110.

When the user of the audio/video/text endpoint 110 speaks or enters text for the conference, the language translator 106 translates the text and/or the audio into text and/or audio. The language translator 106 then transfers the resulting converted media to the content distributor/mixer 114 for dissemination to the remaining participants 122. Hence, with respect to the audio/video/text endpoint 110, outbound text and/or audio is selectively translated into text and/or audio consistent with the conference language. Inbound language may also be translated to audio and/or text that is understandable by the user of the audio/video/text endpoint 110.

The second audio/text endpoint 122 does not include a language translator. Accordingly, if the user of the audio/text endpoint 122 wishes that inbound or outbound language content be translated to a desired language, the user may employ the audio/text interface 126 and the second conference-connection module 124 to select an appropriate language translator via the language-transfer selector 120 running on the conference controller 104. In the present operative scenario, the content distributor/mixer 114 employs an appropriate translator of the language-translation system 102 to translate conference language content into the language of the user of the audio/text endpoint 122 in accordance with the preselected options maintained via the language-translator selector 120.

Alternatively, the language-translator selector 120 automatically determines the incoming language from the audio/text endpoint 122 and activates appropriate language-translation functionality via the language-translation system 102 in response thereto. Various modules 102, 114-120 of the conference controller 104 may pull software updates and or additional functionality from a remote software pool 128 as needed for a given application.

Figure 4:
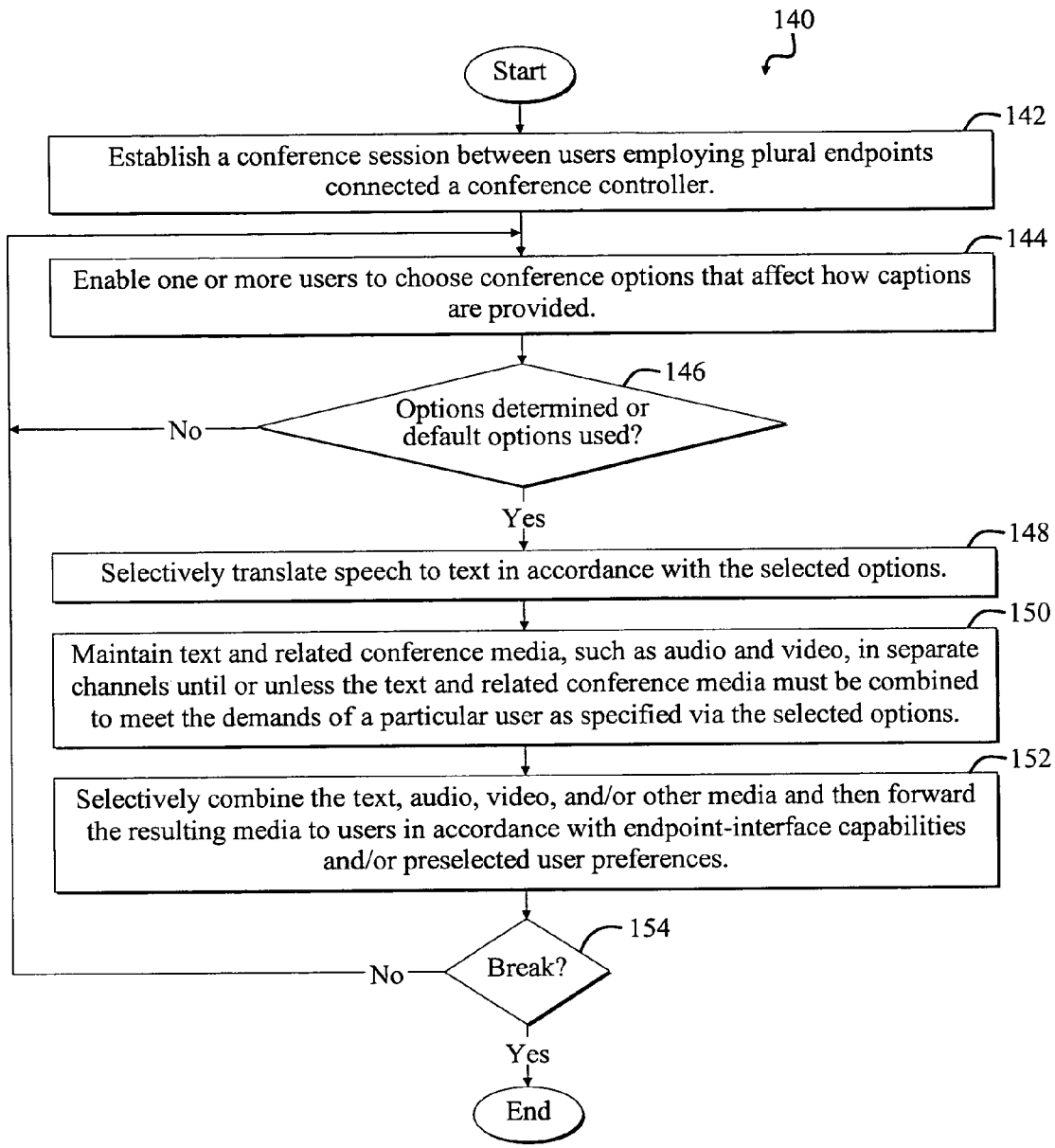
FIG. 4 is a flow diagram of a captioning method adapted for use with the embodiments of FIGS. 1-4.

FIG. 4 is a flow diagram of a captioning method 140 adapted for use with the embodiments of FIGS. 1-4. The method 140 includes an initial conference-establishing step 142, wherein a conference session is established between users employing plural endpoints connected to a conference controller.

Subsequently, in an options-providing step 144, one or more conference participants, i.e., conference-system users, are provided with one or more options that affect how conference captions are provided to the users. Examples of options include the option to receive text captions embedded in video; the option to receive text captions in a browser window; the option to receive text captions in an IM session synchronized with incoming video and/or audio, and so on.

If options have been selected or otherwise been determined as determined by an options-checking step 146, then a translating step 148 is performed next. Otherwise, the options providing step 144 continues. The translating step 148 includes selectively translating or converting speech to text in accordance with the options selected in the options-providing step 144.

Subsequently, in a media-preparing step 150, conference media, such as audio, video, and text are maintained in separate channels until or unless the text and corresponding conference media, such as video, must be combined to meet requirements corresponding to options selected by a given user. For example, a given participant may choose to have text captions integrated with video content. In this case, separate video and text channels are combined or overlaid before transmission to the endpoint employed by the user.

Next a media-distributing step 152 is performed. The media-distributing step includes selectively combining conference media, such as video, text, and audio in accordance with predetermined options and/or preferences. The selectively combined media is then forwarded to the appropriate endpoints.

In a subsequent break-checking step 154, the method 140 determines if a system-break has occurred, in which case the method 140 completes. Otherwise, the method continues at the options-providing step 144. A system break might occur in the event of a closure of a given conference session, a communications failure, etc.

Various steps of the method 140 may be altered, interchanged, and/or omitted without departing from the scope of the present invention. For example, the break-checking step 154 may be omitted or placed elsewhere in the method flow 140.

Figure 5:
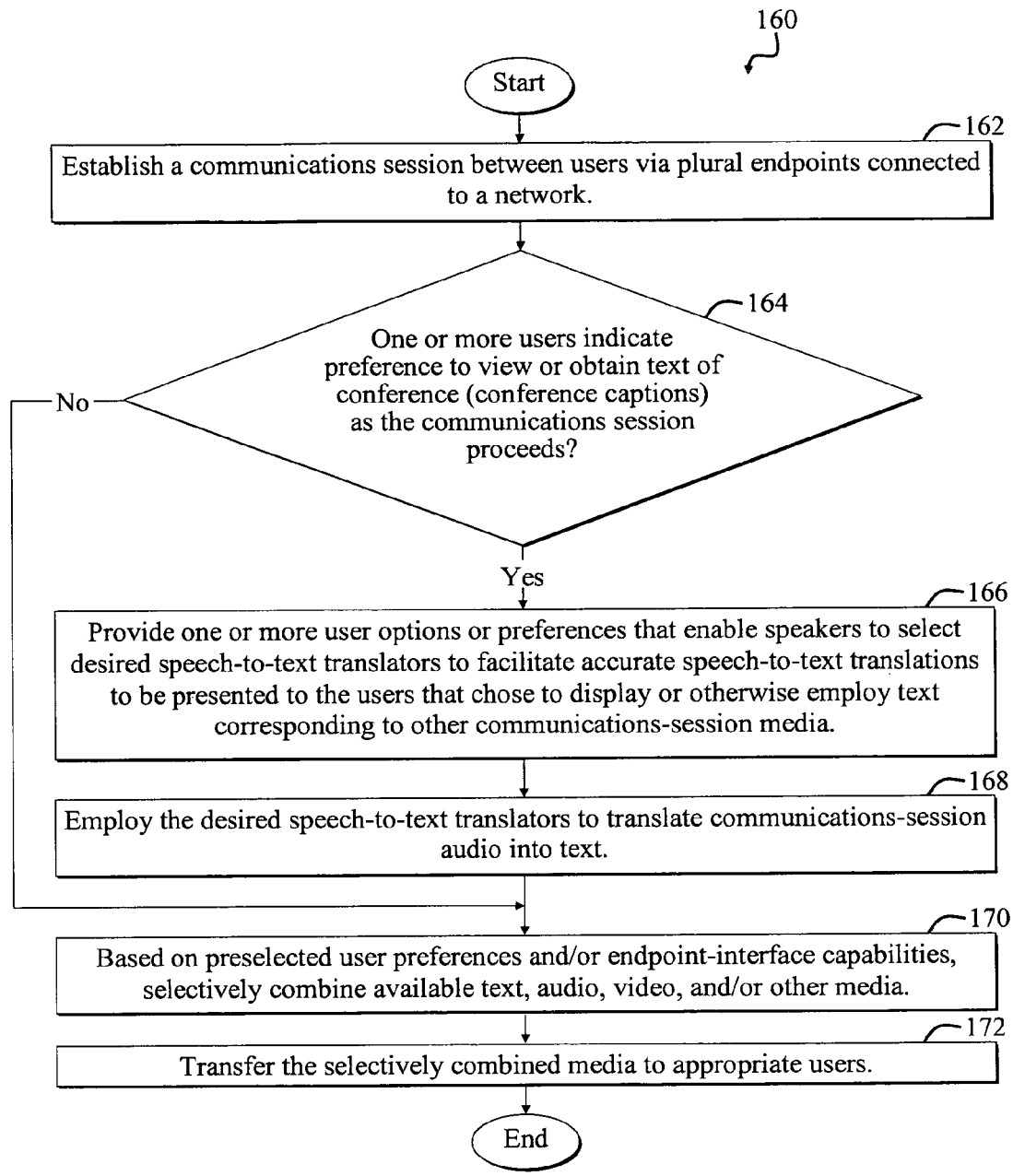
FIG. 5 is a flow diagram of an alternative captioning method adapted for use with the embodiments of FIGS. 1-4.

FIG. 5 is a flow diagram of an alternative captioning method 160 adapted for use with the embodiments of FIGS. 1-4. The method 160 includes an initial communications session-establishing step 162, wherein a communications session is established between users via plural endpoints that are connected to a network.

Subsequently, a text-option-checking step 164 is performed next. The text-option checking step 164 includes determining weather one or more users have indicated a preference to view or obtain text corresponding to communications of the communications session as the session proceeds. If no users have chosen to receive text, then a media-combining step 170 is performed.

The media-combining step 170 includes combining available text, audio, video, and/or other media based on preselected user preferences. If the communications-session participants have not indicated preferences to receive text, then audio and video are combined or not combined based on the remaining selected user preferences or options.

Subsequently, a media-transferring step 172 includes selectively transferring the selectively combined media to appropriate participants in the communication session.

If the text-option checking step 164 determines that one or more users whishes to receive text corresponding to other media employed in the communications session, then an STT converter-selection step 166 is performed next. The STT converter-selection step 166 includes providing one or more additional user options or preferences that enable participants, such as speakers, to select desired STT converters and/or translators to facilitate accurate speech-to-text conversions and/or translations. The selection of STT translators and/or converters may be implemented automatically, such as via the language-translator selector 120 of FIG. 3, which may select speech converters in addition to or instead of language translators.

The selected speech-to-text translators and/or converters are then employed to translate and/or convert communications-session audio in an STT-converting step 168. Subsequently, the media-combining step 170 followed by the media-transferring step 172 are performed, and the method 160 is complete.

Hence, certain systems and methods implemented according to embodiments of the present invention may provide closed captioning in conferences; may integrate video with IM text as needed for a given application; may support sidebar conferencing with whisper functionality; may allow interleaving of conference prompts; may allow selection of translators and/or converters that are tuned for a specific user or location; may address accessibility requirements for certain applications; may support language translation on a per-user basis; may support text-only and observer-only endpoints in a rich media conference; may generate or maintain a transcript of a conference, and so on.

Hence, with reference to FIGS. 1-5, the systems 10, 60, 100 and methods 140, 160 provide a way to implement highly adaptable conferences to meet the needs of a given application. Note that various embodiments may be adapted to work with various types of networks, either wired or wireless, such as cellular networks, Local Area Networks (LANs), Wide LANs (WLANs), the Internet, and so on.

While the present embodiment is discussed with reference to systems and methods for facilitating text captioning for conferences, embodiments of the present invention are not limited thereto. For example, media other than text captions, such as graphics-symbol captions may be employed without departing from the scope of the present invention.

Although embodiments of the invention are discussed primarily with respect to server-client architecture, any acceptable architecture, topology, protocols, or other network and digital processing features can be employed. In general, network controllers, managers, access points, endpoints, clients, and so on, can be implemented via any device with processing ability or other requisite functionality.

Although processes of the present invention and the hardware executing the processes may be characterized by language common to a discussion of the Internet (e.g., "client," "server," "peer"), it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a client and server program, can be executing in a single machine, or in different machines. A single program can be operating as a client for one information transaction and as a server for a different information transaction.

Any type of processing device can be used as a client. For example, portable computing devices such as a personal digital assistant (PDA), cell phone, laptop computer, or other devices can be employed. In general, the devices and manner of specific processing (including location and timing) are not critical to practicing important features of the present invention.

Although the invention has been discussed with respect to specific embodiments thereof, these embodiments are merely illustrative, and not restrictive, of the invention. Embodiments of the present invention can operate between any two processes or entities including users, devices, functional systems, or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
   receiving a first data stream including a conversion of audio speech from a first speaker in a conference;
   receiving a second data stream including a conversion of audio speech from a second speaker in the conference;
   displaying videos of the first and second speakers during the conference, wherein each video is maintained on a separate channel, each channel representing a separate data stream; and
   displaying at least a portion of the first and second data streams concurrently with the videos.

2. The method of claim 1, further comprising accepting a signal from a user input device to filter a data stream.

3. The method of claim 1, further comprising accepting a signal from a user input device to prioritize a data stream.

4. The method of claim 3, further comprising prioritizing a data stream according to a volume level of audio speech from which the data stream is derived.

5. The method of claim 1, further comprising displaying portions of both the first and second data streams and the video on a display screen at the same time.

6. The method of claim 1, wherein the data streams are displayed as text.

7. The method of claim 1, wherein the text is displayed as an overlay onto the video.

8. The method of claim 1, wherein the conversion of audio speech from the first speaker occurs locally to the first speaker, and wherein the conversion of audio speech from the second speaker occurs locally to the second speaker.

9. A method comprising:
   establishing a conference between a first participant and a second participant, the conference exhibiting exchange of a first type of media;
   providing a user option to augment the conference with a second type of media corresponding to the first type of media and providing a signal in response thereto;
   generating the second type of media based on one or more conference parameters in response to the signal;
   displaying videos of the first and second participants during the conference, wherein each video is maintained on a separate channel, each channel representing a separate data stream; and
   displaying at least a portion of the first and second types of media concurrently with the videos.

10. The method of claim 9 wherein the step of generating the second type of media includes automatically generating the second type of media.

11. The method of claim 10 wherein the first type of media is provided approximately concurrently with the second type of media, the second type of media being automatically electronically generated.

12. The method of claim 9 further including selectively providing the second type of media to one or more participants in the conference based on predetermined preferences associated with each of the one or more participants.

13. The method of claim 12 wherein the second type of media includes text.

14. The method of claim 13 wherein the one or more conference parameters include an audio portion of conference communications.

15. The method of claim 13 wherein the one or more conference parameters include conference prompts.

16. The method of claim 13 wherein the step of selectively providing further includes selectively providing text approximately concurrently with the conference.

17. The method of claim 16 wherein the second type of media includes text representing conference prompts.

18. The method of claim 16 wherein the second type of media includes text representing audio information.

19. The method of claim 18 wherein the audio information includes audio information having been converted to the text via one or more speech-to-text (STT) converters.

20. The method of claim 19 wherein the one or more STT converters include one or more active speech recognition systems (ASRs).

21. The method of claim 20 wherein the one or more conference parameters include parameters indicating user preferences.

22. The method of claim 21 wherein the user preferences include information indicating a preferred ASR system for one or more participants.

23. The method of claim 22 wherein the preferred ASR system includes a customized ASR system having been trained by the one or more participants.

24. The method of claim 19 wherein the STT converters include one or more STT converters coupled to or integrated into one or more endpoints.

25. The method of claim 19 wherein the STT converters include one or more STT converters coupled to or integrated into a conference-control system.

26. A method comprising:
   employing an active speech recognition system to convert speech from at least one of a first participant and a second participant in a conference into text;
   automatically transferring the text, approximately concurrently with audio information corresponding to the speech, to at least one of the first participant and the second participant;
   displaying videos of the first and second participants during the conference, wherein each video is maintained on a separate channel, each channel representing a separate data stream; and
   displaying at least a portion of the first and second data streams concurrently with the videos.

27. A method comprising:
   establishing a communications session between a first participant and a second participant;
   converting speech from at least one of the first participant and the second participant into text;
   selectively providing the text to the first participant and/or the second participant approximately concurrently with the speech;
   displaying videos of the first and second participants during the communications session, wherein each video is maintained on a separate channel, each channel representing a separate data stream; and
   displaying at least a portion of the first and second data streams concurrently with the videos.

28. The method of claim 27 further including associating a given speech-to-text translation with the first participant or the second participant via one or more annotations.

29. The method of claim 28 wherein the communications session is a videoconferencing session.

30. The method of claim 29 wherein the step of selectively providing includes delivering the text as captions accompanying video that is sent to the first participant and/or the second participant.

31. The method of claim 27 further including providing a user option to not receive text captions simultaneously with speech from participants.

32. An apparatus comprising:
one or more processors and
a non-transitory, machine-readable medium including instructions executable by the one or more processors for:
   receiving a first data stream including a conversion of audio speech from the first speaker in a conference;
   receiving a second data stream including a conversion of audio speech from the second speaker in the conference;
   displaying videos of the first and second speakers during the conference, wherein each video is maintained on a separate channel, each channel representing a separate data stream; and
   displaying at least a portion of the first and second data streams concurrently with the videos.

33. A non-transitory, machine-readable medium including instructions executable by a processor, the machine-readable medium comprising one or more instructions for:
   receiving a first data stream including a conversion of audio speech from the first speaker;
   receiving a second data stream including a conversion of audio speech from the second speaker;
   displaying videos of the first and second speakers during the course of the conference, wherein each video is maintained on a separate channel, each channel representing a separate data stream; and
   displaying at least a portion of the first and second data streams concurrently with the videos.

\* \* \* \* \*